June 24, 1930.  E. G. MUNZ  1,766,138
SPRINKLER
Filed Aug. 6, 1928
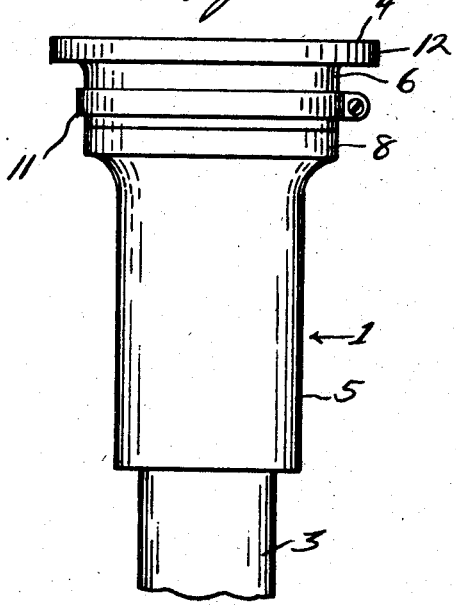
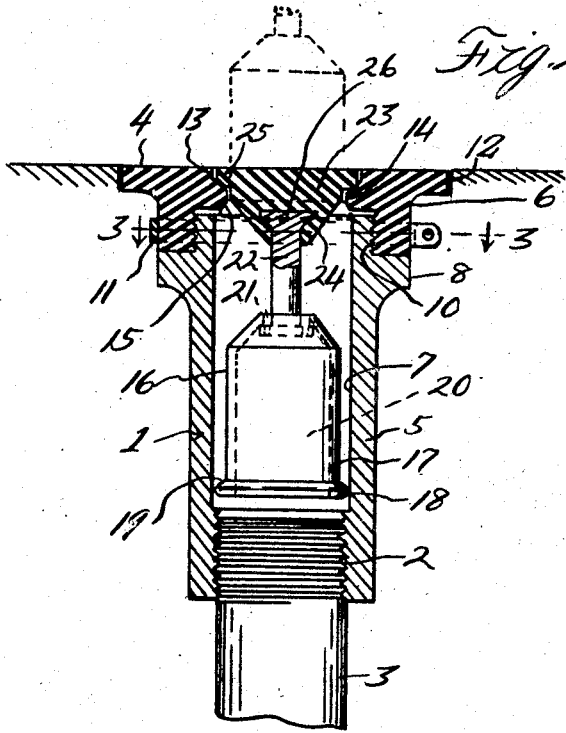
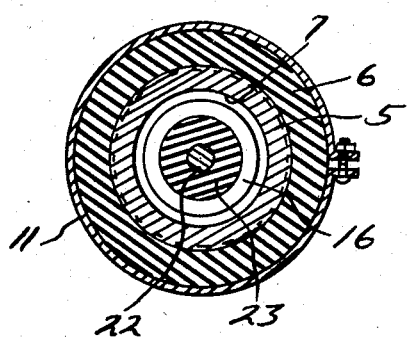
Inventor
Elmer G. Munz Patented June 24, 1930

1,766,138

UNITED STATES PATENT OFFICE

ELMER G. MUNZ, OF DETROIT, MICHIGAN

SPRINKLER

Application filed August 6, 1928. Serial No. 297,699.

The invention relates to spray heads adapted for use in sprinkling systems for lawns and the like, and is particularly applicable in systems where the spray heads are permanently installed in the ground to be normally flush with the surface thereof and the nozzle itself is slidable within the head so as to be projected above the ground whenever the water supply is turned on.

Formerly it has been the practice to construct the entire sprayer of some non-corrodible metal such as bronze. It has been found however, that when the sprinkling system is installed upon a base ball, football or other athletic field that there is great danger of the players falling upon the exposed upper surfaces of the sprayer heads and nozzles and seriously injuring themselves. It has also been found that even when the sprinkling systems are installed in parks, cemeteries and the like where tractors or power mowers are used for cutting the grass, the exposed portions of the sprinklers are liable to be damaged by these tools. It is the object of the present invention to eliminate these objectionable features by forming the parts of the sprinklers normally exposed to view, of some resilient material such as rubber. Thus if a player happened to fall upon one of the resilient heads the likelihood of his being injured is greatly minimized, or if a power mower ran over an exposed head, the latter would merely be compressed with no injury to the sprinkler.

With the above and other objects in view, the invention consists in certain novel features of construction, combinations and arrangements of parts as will be more fully described and particularly pointed out in the appended claims.

In the drawings:

Figure 1 is a side elevation of a sprinkler constructed in accordance with the present invention;

Figure 2 is a vertical section thereof; and

Figure 3 is a section taken on line 3—3 of Figure 2.

Referring now to the construction as illustrated in the drawing, the numeral 1 represents generally the fixed casing of the device provided with a threaded connection 2 for receiving the water supply pipe 3. Where the casing is used for the lawn sprinkling system, it is usual to bury the same in the ground so that the upper surface 4 is substantially flush with the ground. The casing is preferably made of two parts, the lower body portion 5 formed of metal and the detachable upper portion or collar 6 formed of rubber or some other resilient material. The body portion 5 has a smoothly finished cylindrical surface 7 of slightly larger diameter than the threaded portion 2. At the upper end of the body 5 there is preferably provided an outer flange 8 formed with a suitable wrench hold. Above the flange 8 the body is exteriorly threaded at 10 and the lower end of the collar is fitted over this threaded portion and secured to the body by means of a suitable clamp 11, this clamp pressing the rubber into the serrations formed by the threads and thus insuring a tight joint. The collar is preferably formed with a top flange 12 and has an annular recess 13 in the top surface 4 thereof for the purpose hereinafter described. The collar is also provided with the inwardly extending annular flange 14 of smaller diameter than the cylindrical surface 7 and this flange has on the underside thereof, a conical seat 15.

16 is a slidable nozzle member arranged within the casing 1 and adapted to normally be entirely contained within the same with its upper surface flush with the upper surface of the casing. The nozzle member comprises a cylindrical base portion 17 of a diameter such as to freely slide within the annular flange 14 and at the lower end of the base there is an enlarged portion 18 provided with a conical shoulder 19 forming a valve which is adapted to engage the conical seat 15 when the nozzle member is raised by the water pressure. The nozzle member has a hollow interior 20 through which the water is delivered to discharge apertures 21. These apertures surround an upstanding stem 22 to which is secured a spray directing member 23. Similar to the collar 6 this member is formed of rubber and consists of a conical directing portion 24 and a cap 25 having a flat upper surface adapted to lie flush with the upper surface of the flange when the nozzle is in inoperative position. The member 23 is preferably molded to the upper end of the stem 22, the latter being provided with a head 26 for preventing the member from being pulled off the stem.

With the sprinkler constructed in the manner above recited, it will be evident that when the nozzle is in its lower inoperative position with the cap 25 received in the recess 13 that all of the parts exposed to view are formed of a resilient material such as rubber; therefore any blow received from a vehicle passing over the sprinkler will be cushioned with no damaging effect to any of the sprinkler parts. With such an arrangement a person falling upon one of the sprinklers will come into contact with a soft yieldable surface instead of a hard metallic one and will thus be protected from injury. It will therefore be apparent that I have provided an improved form of sprinkler in which objectionable features present in sprinklers now in use have been eliminated without sacrificing any of the advantages thereof.

What I claim as my invention is:

1. In a sprinkler for lawns and the like, a casing having its upper portion formed of a resilient material and lying substantially flush with the surface of the ground, a nozzle member movable in said casing and having a metallic stem, and a resilient spray directing member secured to the upper end of said stem and having a cap cooperating with the upper portion of said casing to form a protecting surface.

2. In a sprinkler for lawns and the like, an outer fixed section and an inner movable nozzle section, said nozzle section including a metallic stem having an enlarged head at its upper end and a spray directing member formed of resilient material within which the head of said stem is embedded.

3. In a sprinkler for lawns and the like, a casing having its upper portion lying substantially flush with the surface of the ground and provided with a seat, and a nozzle member slidably mounted in said casing and provided with an upper shouldered portion constituting a valve adapted to engage said seat when the nozzle is in its lower inoperative position, the aforesaid upper portions being formed of a resilient material.

4. In a sprinkler for lawns and the like, a casing adapted to be positioned below the surface of the ground, a protective collar mounted upon the upper end of said casing, having an opening therethrough, and having an upper surface adapted to be substantially flush with the surface of the ground, and a nozzle movable longitudinally of the casing and having spray directing and cap portions respectively of yieldable material adapted when in inoperative position to be received within the opening aforesaid in said collar so that said cap portion when in this inoperative position is in the horizontal plane of and cooperates with the collar of yieldable material to provide a yieldable protective covering for said casing and nozzle.

5. In a sprinkler for lawns and the like, a casing, a collar for the casing formed of resilient material and having an opening therethrough, a nozzle movable relative to the casing and having a resilient element shaped to provide a spray directing portion and a cap portion and adapted when the nozzle is in inoperative position to be received within the opening within the collar and to cooperate therewith to form a sectional protective covering for the casing and other portions of the nozzle within the casing.

6. In a sprinkler for lawns and the like, a casing, a collar upon the casing, and a nozzle movable relative to the casing and having a resilient element shaped to provide a spray directing portion and a cap portion and adapted when the nozzle is in inoperative position to be received within a portion of the collar whereby the upper surfaces of said cap portion and collar are substantially flush.

In testimony whereof I affix my signature.

ELMER G. MUNZ.